June 28, 1955 P. K. BRIDENBAUGH 2,712,084
MOTOR STATOR ASSEMBLY
Filed April 21, 1954
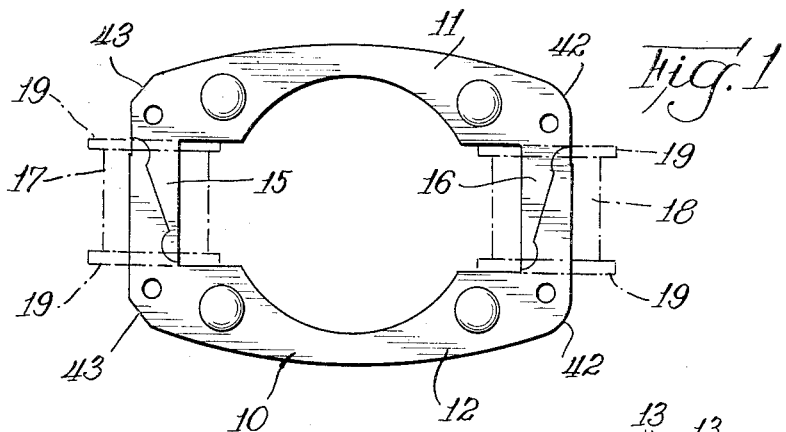
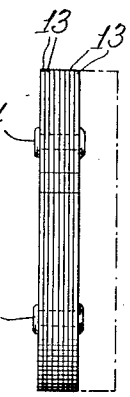
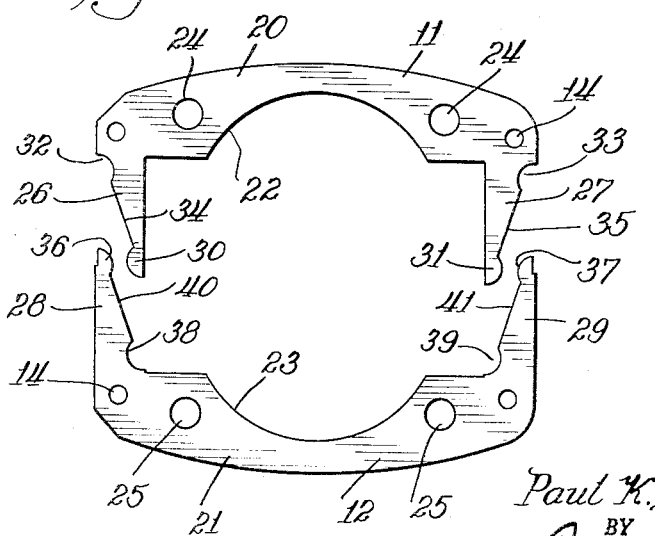
INVENTOR.
Paul K. Bridenbaugh
BY
Atty.

United States Patent Office 2,712,084
Patented June 28, 1955

2,712,084
MOTOR STATOR ASSEMBLY

Paul K. Bridenbaugh, Chicago, Ill., assignor to Supreme Products, Inc., Chicago, Ill., a corporation of Illinois Application April 21, 1954, Serial No. 424,585

6 Claims. (Cl. 310—216)

This invention relates to a motor stator assembly and more particularly to a stator or field core useful especially in relatively small motors such as are employed in electric shavers and similar devices.

An object of the invention is to provide a stator assembly for motors in which the core is formed in separable sections whereby the field windings can be wound independently and then mounted bodily upon the poles provided by the core.

Another object of the invention is to provide a core formed in separable units, the units being quickly, easily and readily joined and separated when required, yet, when joined, are interlocked so that there is substantially no possibility of inadvertent separation.

Still another object is in the provision of a laminated core formed in two halves, each half providing elongated legs having interlocking portions that, when brought together, provide the poles of the core.

A further object is in providing a core structure as described in which a double interlock is provided for each pair of legs; the double interlock assuring a tight, abutting engagement for positive contact between the legs throughout their length, whereby the magnetic circuit about the core is substantially uninterrupted, with the result that there is a low magnetic reluctance in the circuit; the positive contact under tension throughout the length of the legs being further effective to prevent warpage of the legs and poles or vibration of the laminations, the double interlock being at each end of the legs where the core has greatest rigidity.

Still a further object is in providing a structure as described, wherein the core sections are joined and separated by relative longitudinal movement between the elongated legs provided by the sections with correct orientation assured, the legs being slightly yieldable laterally to permit longitudinal movement of the legs into and out of the interlock position.

Additional objects and advantages will appear as the specification proceeds.

An embodiment of the invention is illustrated in the accompanying drawing in which:

Fig. 1 is a plan view of a core structure embodying my invention;

Fig. 2 is an end view in elevation of the core structure shown in Fig. 1; and

Fig. 3 is a plan view showing the sections of the core structure in separated or exploded relation.

Shown in the drawing is a core which is designated generally with the numeral 10. The core 10 is formed by separable sections or units 11 and 12 as shown best in Fig. 3. The sections 11 and 12, as is seen best in Fig. 2, are each formed by placing in adjacent relation a plurality of laminations 13 as they are stamped from the same strip and by joining these laminations together by means of rivets 14, as is seen in Fig. 1, the core 10 is equipped with a pair of poles 15 and 16 which are adapted to receive thereon the field windings 17 and 18 which are shown in Fig. 1 in phantom. The core 10 and the field coils 17 and 18 provide the stator assembly of a motor.

As is well understood, the individual laminations 13 which are stacked one upon another in forming the sections 11 and 12 of the core, are preferably insulated from each other in any suitable means, any number of which are well known to those skilled in the art. The individual laminations 13 may be struck or stamped from stock material in the configuration shown in Figs. 1 and 3. Since means for providing core laminations and for insulating and thereafter joining the same together are well known in the art, it is believed that a further description thereof is unnecessary for purposes of adequately describing the present invention.

Similarly, the field windings 17 and 18 are wholly conventional, and as is customary in the art, may be formed or wound about bobbin or coil forms which are generally equipped centrally with a core and are provided at each end with flange portions which are indicated by the numeral 19 in Fig. 1.

Each of the core sections 11 and 12 respectively are provided with base or body portions 20 and 21. It will be noted that the rivets or anchoring members 14 are provided adjacent the lateral edges of each of the sections 11 and 12. Interiorly and centrally, each of the body portions is arcuate as is indicated at 22 and 23. When the sections 11 and 12 are brought together as shown in Fig. 1, the arcuate portions 22 and 23 provide a central opening therebetween that is adapted to receive therein the armature of a motor. Spaced laterally of the arcuate portion 22, the section 11 is provided with a pair of openings 24 therethrough and similarly the section 12 is provided with openings 25 spaced laterally of the arcuate portion 23. The openings 24 and 25 are suitable for receiving elongated bolts therethrough which are useful in anchoring the core in position within a motor housing which is not shown.

The body 20 of the core section 11 is equipped adjacent the lateral edges thereof with elongated legs 26 and 27. In the same manner, the body portion 21 of the core section 12 is equipped with elongated legs 28 and 29. The core sections 11 and 12 are adapted to be moved toward or away from each other so that the legs 26 and 28, and 27 and 29, move longitudinally or axially relative to each other. When the core sections are together, as shown in Fig. 1, the legs 26 and 28 provide the pole 15, while the legs 27 and 29 provide the pole 16. For convenience, the core section 11 may be referred to as the inner core member or section, while the core section 12 may be referred to as the outer core section simply because the legs 28 and 29 which are provided by the section 12 receive the legs 26 and 27 therein, which are provided by the section 11.

The core section 11 is substantially symmetrical about a vertical center line therethrough, and it is seen that the legs 26 and 27 are equipped at their outer end portions with arcuate ears or key or tongues that are designated respectively with the numerals 30 and 31. Adjacent the base or body 20 of the section 11, where the legs 26 and 27 join the same, are arcuate recesses or grooves 32 and 33. The ears 30 and 31 and the grooves 32 and 33 are along the outer edge of the legs 26 and 27, and are separated respectively by the inwardly and downwardly inclined edge portions 34 and 35. It may be noted that the grooves or recesses 32 and 33 are adjacent the face 20 and are further adjacent the rivets 14 which rigidly secure the laminations 13 one to another in stacked relation.

The core section 12 is found to be symmetrical about a vertical line therethrough and the leg portions 28 and 29 thereof are equipped at their outer free ends and along the inner edge thereof with generally arcuate ears or tongues 36 and 37. At the inner ends of the legs 28 and 29 and adjacent the base 21, grooves or recesses 38 and 39 are provided. The tongue and groove 36 and 38, and tongue and groove 37 and 39 are separated respectively by upwardly and outwardly inclined edges 40 and 41 provided by the legs 28 and 29 on the inner surface thereof.

In operation of the structure, the core sections 11 and 12 are first provided in the configuration shown and which has been described in detail. In forming a stator assembly, a pair of field windings 17 and 18 are first slipped over either the legs 28 and 29 provided by the core section 12 or over the legs 26 and 27 provided by the core section 11. Thereafter the legs of the opposite core section are inserted into the field windings and the core sections 11 and 12 are pushed together. In this movement it will be appreciated that the legs 26 and 28 and 27 and 29 move longitudinally relative to each other.

In this movement, the arcuate tongues 36 and 37 ride along the inclined edges 34 and 35 while the arcuate tonguees 30 and 31 ride along the inclined surfaces 40 and 41. As the tongues at the free end portions of the legs approach their respective recesses or grooves, each of the legs deflects laterally, slightly, to permit the tongues or ears to enter the grooves. When the tongues snap into the grooves, it is found that the inclined edges 34 and 40 and the inclined edges 27 and 41 provided by adjacent legs are in tight engagement throughout their entire length because they are returned to the respective positions occupied as they were stamped from each other, it being noted that they are oriented end for end by the characteristics of the stamped form in which the elements are rounded at one pair of corners as at 42 and straight cut at the other pair of corners as at 43. Also, the arcuate tongues engage the arcuate surface of the grooves throughout their entire length. Thus a positive contact or coupling is provided between the legs 26 and 28 and the legs 27 and 29 throughout their entire lengths which operates to hold the field coils clamped in position.

This contact between the adjacent legs which comprise the poles of the core is important for it permits a continuous magnetic circuit about the entire core. At the same time, the tight gripping between the legs prevents the legs from warping or rattling which would interfere with the continuancy of the magnetic circuit or be objectionable. The core sections 11 and 12 cannot move laterally relative to each other because the abutment between adjacent legs prevents such movement. It is difficult to move one of the core sections transversely relative to the other because of the character of the laminations that are joined together in forming the core sections. That is to say, the frictional resistance against transverse movement is quite large because of the plurality of laminations provided by each of the sections.

On the other hand, longitudinal movement between the legs of the core sections is relatively easy, for the arcuate tongues simply ride over the inclined surfaces and into or out of the grooves; yet when the tongues are in place within the grooves, a tight interlock is provided which prevents inadvertent separation of the core sections. It will be appreciated that a double interlock is provided, one at each end of the legs which provide a cove for the core. Also, the interlock is adjacent the base or body portions of the core sections, and this area of the core sections is particularly rigid because the rivets 14 extend through the laminations at this point.

While in the foregoing specification an embodiment of the invention has been set out in considerable detail for purposes of illustration, it will be apparent to those skilled in the art that numerous changes may be made in the details without departing from the spirit and principles of the invention.

I claim:

1. In a laminated core structure adapted for use in a motor stator assembly, a pair of core sections providing together a complete core for a field coil, each of said sections being provided with a plurality of laminations secured together in stacked relation, each of said sections being equipped with elongated legs, the legs provided by one section being adapted to be received within the legs provided by the other of said sections, adjacent legs provided by said sections forming together poles for said core for supporting the coil therearound, and cooperating legs being provided with complementary interlocking means for releasably securing the adjacent legs together in snap relationship including interfitting transverse grooves and tongues on cooperating legs.

2. The structure of claim 1 in which each of said legs is provided at the outer end thereof with an arcuate tongue, and in which each of said legs is provided adjacent the inner end thereof with an arcuate groove adapted to receive the tongue therein of the adjacent leg, whereby a double interlock is provided between adjacent legs.

3. The structure of claim 1 in which each of said legs is equipped between the tongue and groove carried thereby with a slanting edge portion, the slanting edge portions of adjacent legs being complementary so that these edges abut each other throughout substantially their entire length when said sections are secured together with the legs thereof in interlocking relation to form a magnetic circuit through the coil.

4. An electromagnetic core comprising a pair of substantially U-shaped core sections with interfitting legs, the legs of one of the sections having transverse grooves and the legs of the other one of the sections having transverse tongues engageable in said grooves, the legs of the respective sections being slanted complementarily along their interfaces so that the legs of each section taper toward their ends with the legs of one section received between the legs of the other section in snugly fitted relationship to form between the sections a magnetic circuit.

5. An electromagnetic core comprising a pair of substantially U-shaped core sections with interfitting legs, the legs of one of the sections having transverse grooves at their base and the legs of the other one of the sections having transverse tongues at their ends engageable in said grooves, the legs of the respective sections being slanted complementarily along the interface of cooperating leg surfaces so that the legs of each section taper toward their ends with the legs of one section received between the legs of the other section in snugly fitted relationship to form between the sections a magnetic circuit.

6. An electromagnetic core comprising a pair of substantially U-shaped core sections with interfitting legs, the cooperating legs having transverse grooves at their bases and transverse tongues at their ends, the tongue on each leg fitting in the transverse groove on the cooperating leg and the legs being slanted complementarily along their interface so that each leg tapers toward its end with the legs of one section received between the legs of the other section in snugly fitted relationship to form between the sections a magnetic circuit.

References Cited in the file of this patent
UNITED STATES PATENTS

| | | |
|---|---|---|
| 495,562 | Perret | Apr. 18, 1893 |
| 553,847 | Freeman | Feb. 4, 1896 |
| 1,993,449 | Larsh | Mar. 5, 1935 |
| 2,064,090 | Sullivan et al. | Dec. 15, 1936 |
| 2,500,191 | Lee | Mar. 14, 1950 |